Jan. 6, 1970   G. M. ZIEBER, JR   3,487,709
AXIALLY DRIVABLE MEMBER AND METHOD OF MAKING
Filed May 29, 1968

INVENTOR.
George M. Zieber, Jr.
BY
Barnard, McGlynn & Reising
ATTORNEYS

United States Patent Office 3,487,709
Patented Jan. 6, 1970

3,487,709
AXIALLY DRIVABLE MEMBER AND
METHOD OF MAKING
George M. Zieber, Jr., King of Prussia, Pa., assignor to Teleflex Incorporated, North Wales, Pa., a corporation of Delaware
Filed May 29, 1968, Ser. No. 732,926
Int. Cl. F16c 1/10; F16h 1/04
U.S. Cl. 74—422          3 Claims

ABSTRACT OF THE DISCLOSURE

An axially drivable member and method of making, said member being adapted for use in a remote control assembly including a tubulous element having a wire wound thereon in a helical pattern with sufficient force to deform the outer surface of said tubulous element to cause indentations in the outer portion of the tubulous element thereby insuring that the wire wound on the element remains in its operative position. The wire that is wound on the tubulous element forms spaced convolutions that project upwardly above the surface of the tubulous element thereby adapting the convolutions of wire to be engaged by a gear type element that, when rotated, drives the composite member axially.

---

This invention relates to motion transmitting remote control assemblies operable in a curved path by use of a flexible core element movably supported in a conduit, and more particularly, to a core element having wire helically wound on the outside surface thereof with sufficient force to cause an indentation under the wire for retaining the wire in the indentation. The hollow center portion of the tubulous element is also adapted to receive electrical wiring, for example. The present invention also relates to a method for making such an axially drivable core element.

It is desirable in certain operative environments, to be able to transmit a force from one point to another wherein the force is generated by rotary motion, and this rotary motion must be translated into linear motion to move a member axially with very accurate control necessary for the amount of distance traveled. It is likewise desirable in the forementioned operative environments to utilize the same member that is moved axially to act as a conduit for the transmission of some type of matter, and thus a tubulous element is very useful. Such an operative environment can be, for example, a nuclear reactor within conditions inside the reactor at a great distance from the nearest access point must be monitored. For example, the temperature condition in various areas of a reactor must be constantly checked; and it is very desirable to be able to move a thermocouple, for example, to various areas of the reactor thereby monitoring this particular type of condition. The electrical leads for such a thermocouple are carried within the tubulous element. It is understood that the present invention is not limited to this particular operative environment, but it is set forth by way of example to illustrate an environment where remote control of motion is necessary, where the source of the motion is rotary, and where the member moved also serves as a conduit for transmission of matter from one point to another.

The prior art teaches various methods for providing a member having some of the characteristics previously set forth as being required in the above-mentioned operative environment. For example, it is known in the art to machine the outer surface of a substantially round element to form portions thereon which are depressions into which a wire is wound to achieve a structure similar to what is required in the environment mentioned. However, machining is practical only when carried out on a very rigid element if any dimensional tolerances are to be maintained; and the machining process is further complicated by its high cost because the machining process would have to be carried out over the full length of an element which may be in excess of 100 feet.

The prior art also teaches a control assembly similar to that required in the operative environment described. This teaching is set forth in U.S. Patent 3,184,986. In this patent, a tubulous element is provided, and a support strip is helically wound thereon to protect the outer surface thereof, and on top of this helically wound strip is reversely wound wire in adjacent relationship so as to support the helical windings. On top of this third tier of support is wound the convolutions of wire having serrations formed thereon to grip the wire beneath and this wire is adapted to be engaged by a gear type element. Whereas this method is successful in providing a drive member of the type needed in the operative environment, the cost is very high and unless great care is taken, the winding of the convolutions of wires adapted to engage the gear can cause a collapsing of the support structure and then make insertion of an electric line, for example, through the center of the tubulous element, rather difficult if not impossible.

Therefore, in order to overcome the shortcomings of the prior art, the present invention contemplates a member that is adapted to be axially driven comprising an elongated tubulous element, and wire means helically wrapped onto the tubulous element with sufficient force to form indentations in the outer surface thereof for retaining the wire means in its operative location. The wire means provides spaced convolutions around the tubulous element, adapting the wire to be engaged by a gear means having an axis of rotation transverse to the longitudinal axis of the tubulous element at the point of contact so that, as it rotates in either direction, a linear motion of the member along its longitudinal axis is generated. The key to accomplishing the foregoing is the forceful wrapping of the wire on the tubulous element thereby forming indentations sufficiently deep to prevent movement of the wire means along the longitudinal axis of the element solely by the friction of the engagement of the wire with the indentations. Desirably, the opposite ends of the wire means can be secured to the tubulous element to prevent relative movement between the wire means and the tubulous element along the helix of the indentations thereby completing the assembly of the composite axially drivable member.

Additionally, the present invention contemplates a method for making a member so described to provide the axially drivable member that is required in the operative environment previously set forth wherein both an axially drivable member is required and also a means for conducting electricity or some other matter from one end of the drivable member to the other.

Accordingly, it is an object of the present invention to provide an improved drivable member that is adapted to be axially driven by a gear by the cooperation of the teeth of the gear with wires helically wound on the outside of a tubulous element and which are operatively positioned in indentations formed therein.

Another object of the present invention is to provide an improved drivable member having wires helically wound on the outside of a tubular element with sufficient force to form indentations in the outside diameter thereof for the retention of the wire in its operative location.

It is still another object of the present invention to provide an improved remote control mechanism adapted to be used in the environment of a nuclear reactor wherein rotary motion is translated into linear motion to axially drive a member comprising a tubulous element and wire deformably wrapped thereon, and electrical lead wires are contained within that tubulous element and terminate at one end of the mechanism in a thermocouple so that the remote control mechanism can be utilized to move the thermocouple to various locations inside of the reactor thereby monitoring temperature conditions therein.

It is a further object of the present invention to provide an improved method for manufacturing the member that is adapted to be axially moved in accordance with the previous objects.

Other objects and intended advantages of the present invention will be readily appreciated as the same becomes better understood by reference to the following detailed description when considered in connection with the accompanying drawings wherein.

Figure 1:
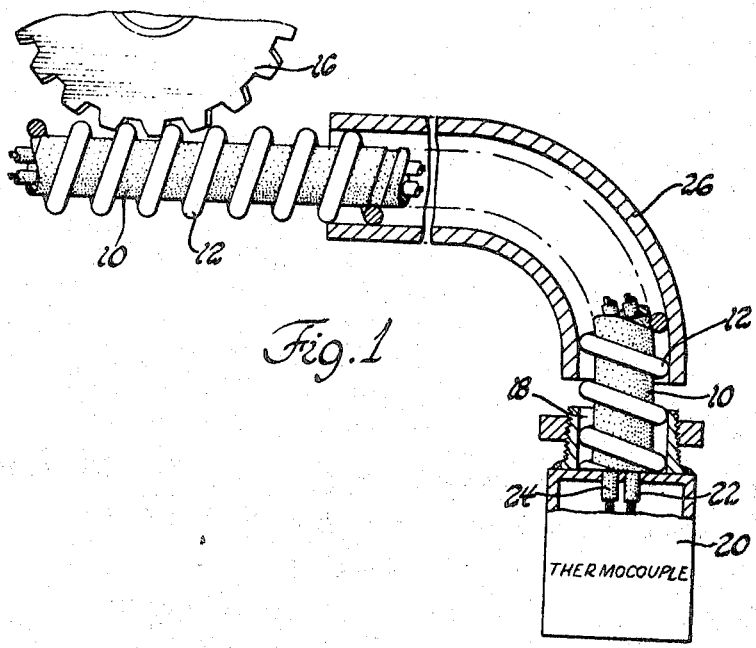
FIGURE 1 is a schematic representation of a control system embodying the axially drivable member of the subject invention.
Figure 2:
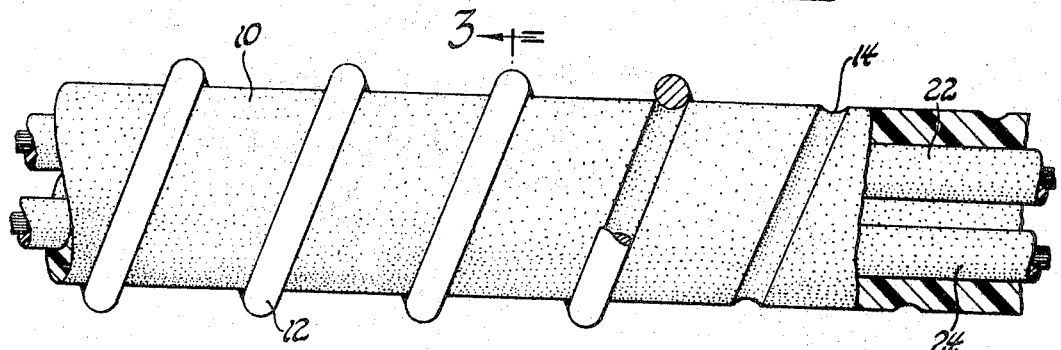
FIGURE 2 is a side elevation with parts broken away of the axially drivable element of the subject invention.
Figure 3:
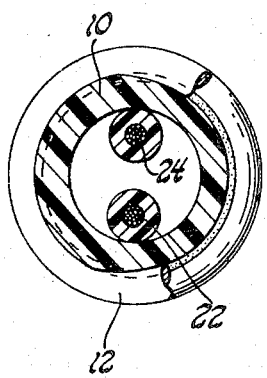
FIGURE 3 is a sectional view taken along line 3—3 of FIGURE 2.

Referring to FIGURE 1, the subject invention is shown in its operative environment wherein tubulous element 10 has wire 12 helically wound thereon with sufficient force so that a helical indentation is formed under wire 12. The indentation is designated by numeral 14 and is better seen in FIGURE 2. Gear member 16 is rotatable on an axis transverse to that of tubulous element 10 and has teeth adapted to engage the convolutions of wire 12. Therefore, at the point of engagement of the teeth of gear 16 with wire 12, rotary motion is translated into linear motion.

Tubulous element 10 and helically wrapped wire 12 terminate at one end in pocket 18 of thermocouple 20 and are fixedly secured thereto, such as by welding. Electrical leads 22 and 24 electrically engage thermocouple 20 and pass through the center of tubulous element 10, and at an opposite end, are connected to any well-known type of recording instrument which can register the temperature in the area of thermocouple 20. Tubulous element 10 and convoluted wire 12 are protected in their passage to the area where the temperature is to be measured by protective guide conduit 26. It is understood that conduit 26 is of any appropriate length, and in certain installations while measuring temperatures in different areas of a nuclear reactor, conduit 26 might be in excess of 100 feet. Therefore, it is seen how the present invention adapts the movement of a thermocouple to areas in the interior of an atomic reactor, for example, that were heretofore inaccessible for temperature monitoring except by more expensive and complex mechanisms.

In the preferred embodiment shown, tubulous element 10 is hollow so that the leads passing through the center thereof can be accommodated therein. It is understood, that it is within the inventive concept herein disclosed, that wire 12 can be wrapped on a solid member with sufficient force to form indentations therein to hold the convolutions appropriately positioned. Such an installation is appropriate where the hollow element 10 is not necessary and only force transmission is important. The wrapping of wire 12 onto tubulous element 10, in the example shown, with sufficient force to form an indentation is extremely important in that wire 12 cannot move axially relative to tubulous element 10 thereby allowing very little loss motion, if any, between the teeth of gear 16 and the convolutions of wire 12 resulting in a remote control device that is extremely accurate as to the amount of axial movement. The importance of this is pointed out in the operative environment herein shown wherein the thermocouple 20 is to be progressively positioned in different areas a great distance from the source of movement and the exact location of the thermocouple at a given moment may be critical to the operation of the device, the temperature of which is being monitored. If desired, the ends of wire 12 can be attached or secured to tubulous member 10 at their ends so as to absolutely guarantee that there is no movement of wire 12 in the helix of the indentation 14 formed on the outer surface of tubulous element 10.

Therefore, in the environment previously described, the present invention teaches a thermocouple assembly that is adapted to be moved from place to place inside an atomic reactor or similar inaccessible area including sensing means, or more particularly the thermocouple probes, and a gear acting as means for controlling movement of the thermocouple by acting through an axially drivable member which traverses the distance from where the gear is located to the point where the thermocouple is situated. The axially drivable member has been previously described and is merely adapted to operate in the environment above described.

The present invention additionally contemplates a novel method of making an axially movable member such as described in the present invention by the step of wrapping wire on the outer portion of a tubulous element with sufficient force to form an indentation thereon beneath the wire which serves to secure the wire in its operative location. Then, if desired, the ends of the wire can be secured at opposite ends of the tubulous member in any well-known manner such as by soldering or welding to prevent relative axial movement between the tubulous element and the wire in the helical indentation. When the wire is originally laid on the tubulous element in the proper manner, a sufficient interlock is established between the wire and the indentation so that when the wire is stressed laterally with respect to the indentation, as when gear 22 acts against the side of a portion of the wire, there is no relative movement. In addition, the wire is so wound on the tubulous element that the spacing of the loops and the height of the wire above the surface of the tubulous member are so related with respect to one another that a suitable gear member rotatable on an axis, generally transverse of the tubulous element, is adapted to progressively engage the wire between gear teeth thereof with very little loss motion which serves to drive the tubulous member axially.

The invention has been described in an illustrative manner, and it is to be understood that the terminology that has been used is intended to be in the nature of words of description rather than of limitation.

Obviously, many modifications and variations of the present invention are possible in light of the above teachings.

The embodiments of the invention in which an exclusive property or privilege is claimed are defined as follows:

1. An assembly adapted to be axially driven comprising: a tubulous member having an outer circular surface and an inner bore for receiving flow conducting means, said inner bore having a substantially uniform diameter therealong, and a wire helically wrapped about said tubulous member in spaced convolutions to deform said outer circular surface into indentations sufficiently deep to prevent casual movement of said wire along the longitudinal axis of said tubulous member.

2. In a method of making a core element of the type for transmitting motion in a motion transmitting remote control assembly and including a tubulous member with a wire wrapped helically thereabout in spaced convolutions, the improvement comprising: winding the wire about the tubulous member while applying sufficient force during the winding to deform and indent the surface of the tubulous member for providing an indentation therein for retaining the wire.

3. In the method as set forth in claim 2 further defined as maintaining a tension force in the length of wire being wound onto said tubulous member for forming the indentations and maintaining the inner bore of the tubulous member substantially uniform therealong while the wire is wound thereabout.

References Cited

UNITED STATES PATENTS

| 2,151,191 | 3/1939 | Crane et al. | 74—422 XR |
| 3,184,986 | 5/1965 | Kompanek | 74—422 |
| 3,302,479 | 2/1967 | Conrad | 74—501 |

LEONARD H. GERING, Primary Examiner

U.S. Cl. X.R.

29—159.2; 74—458, 501; 254—95